Oct. 20, 1959
F. A. HILL 2ND
2,909,033
SLIDING BULKHEAD TRANSMISSION
Filed July 28, 1953
3 Sheets-Sheet 1
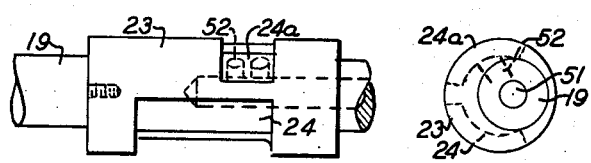
FIG. 2
FIG. 3
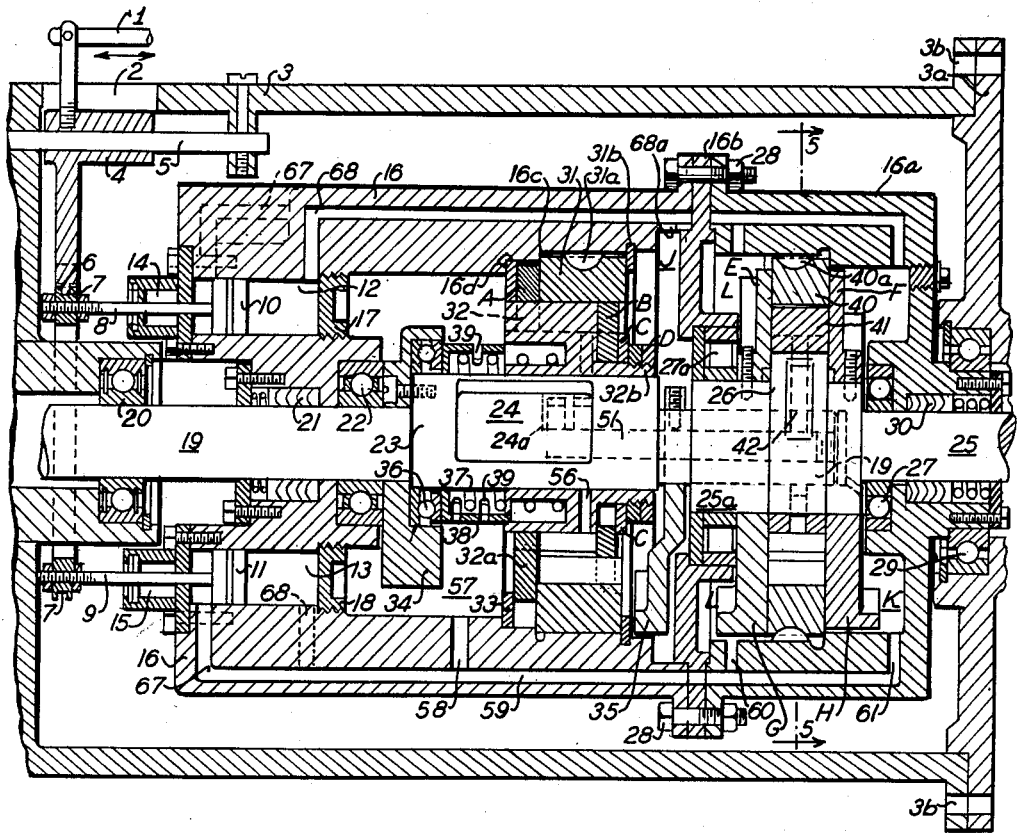
FIG. 1
INVENTOR.
Francis A. Hill 2nd
BY
Young, Emery & Thompson
Attys.

Oct. 20, 1959　　　F. A. HILL 2ND　　　2,909,033
SLIDING BULKHEAD TRANSMISSION
Filed July 28, 1953　　　　　　　　　　　　3 Sheets-Sheet 2

INVENTOR.
Francis A. Hill 2nd
BY
Young, Evans & Thompson
Attys.

Oct. 20, 1959 F. A. HILL 2ND 2,909,033
SLIDING BULKHEAD TRANSMISSION
Filed July 28, 1953 3 Sheets-Sheet 3

INVENTOR.
Francis A. Hill 2nd
BY
Young, Emery & Thompson
Attys.

United States Patent Office 2,909,033
Patented Oct. 20, 1959

2,909,033

SLIDING BULKHEAD TRANSMISSION

Francis A. Hill 2nd, Westport, Conn.

Application July 28, 1953, Serial No. 370,756

5 Claims. (Cl. 60—53)

My invention relates to hydraulic transmissions and includes matter shown in Patent No. 2,484,789, abandoned application Ser. No. 232,566 and pending application Ser. No. 359,487, now abandoned, combined with new matter.

One of the objects of my invention is to so arrange the hydraulic flow thru pump and motor that there is a hydraulic lock at full speed. This eliminates "creep" which now exists in other types of hydraulic transmissions on the market.

Another object of my invention is to increase the torque per revolution transmitted from the power shaft to the output shaft of the transmission as the speed of the output shaft decreases.

A third object of my invention is to have a positive control of the speed of the output shaft (to the rear end of an automobile or truck) during the whole speed range from zero miles per hour to the limit of speed which the engine can produce.

Still another object of my invention is to confine the high pressure fluid to internal members so that the casings and stuffing boxes are not subject to extreme pressures.

Heretofore the available torque power transmitted from the engine thru a hydraulic fluid drive of the Gyrol or Dunaflow type has been due to centrifugal force plus kinetic energy. This kinetic energy is transmitted more easily when there is a large difference in the speed of the input or engine shaft as compared to the speed of the output shaft. When the two shafts are going at nearly the same speed there is a loss in the transmission of power.

Most hydraulic transmissions have to have gears for different speeds combined with the hydraulic unit.

In my invention I overcome these additional accessories to the fluid hydraulic transmission by the use of Rotoids or Gerotors.

In this use of Rotoids or Gerotors I use one pair as a pump and the other pair as a motor. But I so connect the discharge ports and intake ports of the pump and motor that at the maximum flow of hydraulic fluid there is the greatest transfer of torque per revolution at the slowest of output speeds, while at full speed when there is no differential in speed of the input and output shafts there is no flow of hydraulic fluid.

This accomplishes three things:

(a) When in "low gear" the greatest amount of power is available per revolution.

(b) When in "change speed gear" there is a variance in available torque per revolution in inverse ratio to the change in speed.

(c) When in so called "full speed" there is a hydraulic-mechanical lock so that the input and output shafts run at the same speed with no fluid flow.

By varying the effective length of the Rotoids or Gerotors in either the pump or in the motor a greater or less volume of hydraulic fluid flows thru them per revolution. If the motor is the unit in which the effective pumping length of the gears is varied, it can be made to handle a greater or less amount of fluid per revolution than the pump. More fluid produces more torque.

In my type of construction I prefer to have the outer gears rigidly connected together in a casing which is free to rotate. When there is a hydraulic lock so that neither set of inside gears can roll around inside their respective outer gears, the latter will revolve at the same speed as the input shaft. This causes their casing to revolve with them and for all practical purposes there is a direct mechanical drive. This is explained in detail below.

In the figures:

Fig. 1 is a sectional elevation on line 1—1 Fig. 4 of the transmission.

Fig. 2 shows part of the output shaft with ports.

Fig. 3 shows an end view of the output shaft.

Figure 4:
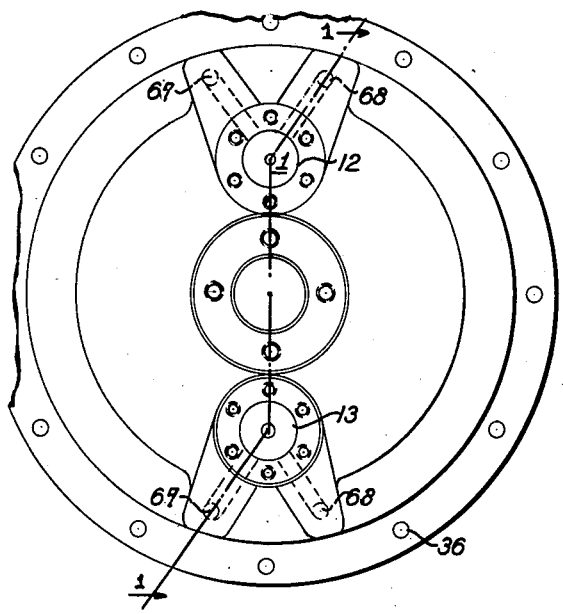
Fig. 4 shows the left hand end view of the rotating casing and control cylinders.

A control lever 1 projects thru an opening 2 in the stationary casing 3 into a slidable sleeve 4. Sleeve 4 carries a tongued member 6 engaging a rotatable grooved ring 7 in which are mounted one or more piston rods 8 and 9 attached to the pistons 10 and 11 in cylinders 12 and 13.

The rods 8 and 9 pass thru stuffing boxes 14 and 15 and are attached to the rotatable casing 16 as shown. The right hand end of the cylinders are preferably closed by plugs 17 and 18 to permit thru boring and honing of the cylinders.

The left hand end of the stationary casing 3 may be part of a gear transmission case. The output shaft 19 which is rotatable in casings 3 and 16 is supported by a bearing 20 in casing 3, passes thru the stuffing box 21 in casing 16, and is supported by another bearing 22 in casing 16. This output shaft 19 carries a cam 23 containing ports 24 and 24a in Figs 1 and 2 and 8 which will be described below. Shaft 19 extends into and can rotate in the drive shaft 25.

The left end 25a of this shaft 25 is enlarged to receive shaft 19 and act as a journal therefore. Shaft 25 carries a similar but shorter cam 26. Shaft 25 rotates in bearings 27 and 27a. Casing 16a is bolted to the casing 16 by bolts 28 as shown. The right end of the casing 16a rotates in the bearing 29 in the end plate 3a of the casing 3. The plate 3a may be bolted to casing 3 at 3b (Figs. 1 and 4) as shown. The drive shaft 25 passes out of 16a thru a stuffing box 30.

Mounted between casings 16 and 16a is a wall member 16b which carries the bearing 27a which supports the enlarged end 25a of the shaft 25.

The casing 16 holds the outer gear 31. This gear 31 is rigidly mounted within the casing 16 and held in position by one or more keys 31a. The snap ring 31b holds this outer gear 31 against the shoulder 16c as shown. Inside 31 is the pinion gear 32, which is slidable lengthwise along and free to rotate on the cam 23 and inside the gear 31. The bulkhead A (Figs. 1 and 6) is slidably mounted on and has a female fit on the teeth and tooth spaces of the pinion 32 and rotates with it between the flat retainer ring 33 and the outer gear 31 which prevent it from longitudinal motion in casing 16.

At the opposite or right hand end of the pinion gear 32 is an outer rotor bulkhead B (Figs. 1 and 7) which can slide axially or lengthwise in the outer gear 31. Retaining ring C and nuts D on the threaded shoulder 32b of the pinion 32 hold the bulkhead B in position against the end of the pinion at all times.

At each end of the cam 23 are counter balance weights 34 and 35 to offset the eccentric throw of the cam 23, pinion 32, bulkhead A, thrust bearing 36, spring 37, and spring retainer ring 38, when the cam rolls the pinion 32 around inside the outer rotor or gear 31. The thrust bearing 36 takes the thrust of the spring 37. The retainer ring 38 has slots 39 to permit hydraulic fluid to flow thru it from the port 24.

The casing 16a contains another set of Rotoid gears. The outer gear 40 (Figs. 1, 5 and 8) is keyed to the casing 16a in one or more places as indicated at 40a. The pinion gear 41 is mounted on the cam 26 of the drive shaft 25. On each side of the gears 40 and 41 and cam 26 are side plates E and F rigidly attached to the enlarged part 25a of the shaft 25. These side plates may have enlarged portions as indicated at G and H (Figs. 1, 9 and 10) for static and dynamic balance when the pinion 41 is rolling around in the outer gear 40.

Figure 8:
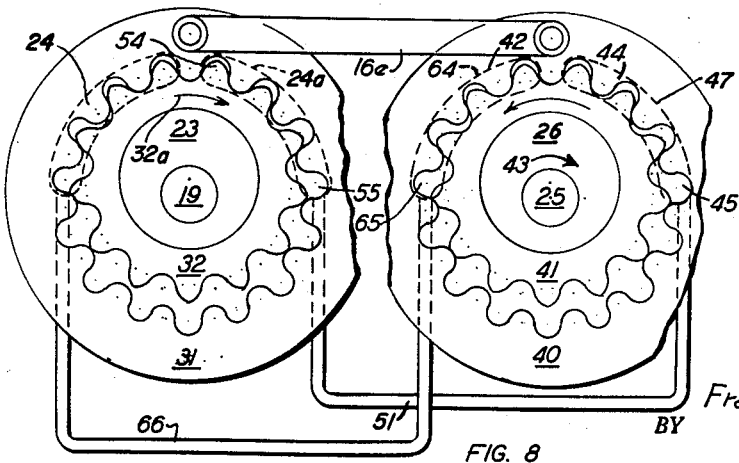
Fig. 8 is a diagrammatic layout showing the relative motions of the input and output shafts and their gears.

Fig. 8 shows a diagrammatic view of Fig. 1 looking from right to left with the hydraulic motor's gears 31 and 32 alongside of the pump gears 40 and 41 instead of behind them. The link 16e represents the casings 16 and 16a. In the momentary position shown in Fig. 8 the discharge port of the pump is on the right side of the gears 41 and 40 connected to the motor intake port 24a also on the right side of the gears 31 and 32.

In a 1 to 0 speed ratio shaft 25 rotates. Shaft 19 is stationary. Hydraulic fluid flows freely from the pump gears 40 and 41 through passageways to the motor gears 31 and 32 and back to the pump gears. When the shaft 25 rotates clockwise its cam rotates with it. The gear 41 travels around inside the gear 40 in the direction of the arrow 43.

Closing gear chambers 44—45 expel fluid into port 47 and into conduit 51 leading to port 24a and opening chambers 54—55. The fluid forcing the opening of these chambers 54—55 cause the gear 32 to rotate on its cam 23 clockwise in the direction of its arrow 32a. Both gears 41 and 32 rotate on their cams at the same speed but in opposite directions. Therefore cam 23 and shaft 19 are stationary. No power is transmitted. To complete the fluid cycle closing rotor chambers in registration with port 24 expel oil into it, thru conduit 66 (representing holes 56 in gear 32, port 24, space 57, conduits 58, 59, 61 in Fig. 1 and 62 in Fig. 9) to port 42 and opening pump chambers 64—65. Ports 24 and 24a, cam 23, and shaft 19 are stationary. These directions of clockwise and counterclockwise movement and the reference arrows indicate the relative motions of the inside gears or pinions with relation to the cams upon which they rotate.

When the output shaft 19 rotates more slowly than the shaft 25 the capacity of the gears per revolution in the pump are different from those in the motor. If the motor has 1/10 of the pump capacity per revolution the shaft 25 will rotate 1/10 faster than the casings 16 and 16a. That is the casings 16 and 16a will rotate 1/10 slower. The shaft 19 will rotate 1/10 slower. The gears 31 and 32 receive this 1/10 volume of oil per revolution and return it to the pump. The other 9/10 of the oil may be considered as static and the shaft 19 rotates 9/10 of the speed of the shaft 25. This is because the outer gears 31 and 40 are linked together rigidly. While this "static" condition may be considered as existing from instant to instant there is a slow flow through the gears and in ten or more revolutions the whole body of oil will flow through the hydraulic circuit.

In a 1 to 1 speed ratio the drive shaft 25 rotates clockwise in the direction of the arrow 43 in Fig. 8. The cam 26 and ports 47 and 42 rotate with it. The teeth of the gear 41 try to enter the tooth spaces 44—45 but cannot do so because of liquid lock explained more in detail below. Therefore the gear 41 drives the gear 40 clockwise with the shaft 25. This rotation is transmitted to the gear 31 thru casing members 16 and 16a in Fig. 1 (represented by the link 16e in Fig. 8). Because of said liquid lock the spaces 54—55 between gears 31 and 32 can not close. Consequently gear 31 drives gear 32, cam 23 and output shaft 19 clockwise and at the same speed as the input shaft 25. The whole mechanism rotates as one solid unit.

Other speed ratios are realized by varying the capacity of the motor gears 31 and 32. As the volume pumped is increased the speed of the shaft 25 increases with relation to the casings 16—16a and shaft 19.

Figure 5:
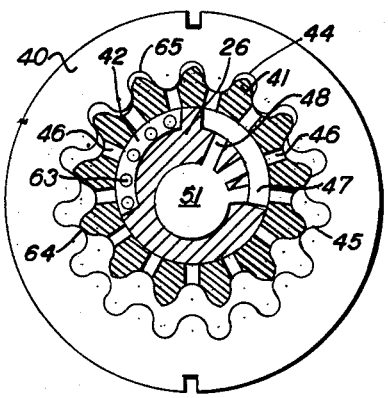
Fig. 5 shows a sectional view of a cam with its ports inside a pair of Rotoid gears on line 5—5 Fig. 1.

When the cam 26 rotates clockwise in Fig. 5, fluid flows from closing gear chambers 44—45, thru holes 46 in gear 41, thru the port 47, holes 48 in cam 26 into groove 49 (Fig. 14), thru holes 50 and into the longitudinal passageway 51 in shaft 19, out thru holes 52 into the intake port 24a of the motor (Figs. 1, 2, 8 and 14). From port 24a the fluid flows into the opening motor gear spaces 54—55 thru holes 56 (Fig. 1) in the gear 32.

Fluid from the closing gear chambers between gears 31 and 32 flows thru holes 56 into port 24, thru slots 39 in the spring retainer ring 38 into chamber 57 of the casing 16 (Fig. 1).

Figures 9, 10:
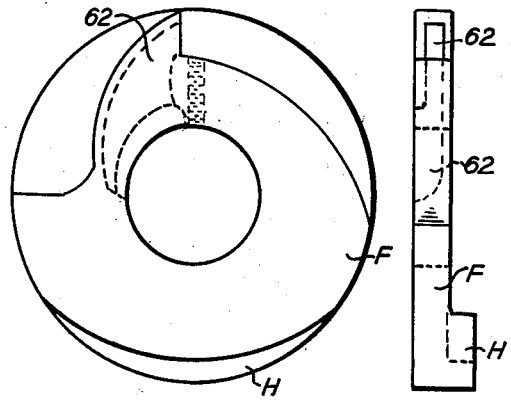
Fig. 9 shows a right hand view of the side plate F.
Fig. 10 shows a side elevation of Fig. 9.

From the chamber 57 (Fig. 1) the hydraulic fluid flows thru conduits 58, 59, 60 and 61 into the chambers K and L outside the side plates E and F in the casing 16a, where it enters intake passageways. One such intake passageway is shown in Figs. 9 and 10 at 62. The inner end of 62 registers with the holes 63 (Fig. 5) which lead into the intake port 42 (Figs. 1 and 8). The hydraulic fluid flows out thru the holes 46 into the expanding gear chambers of the pump. This circuit is shown diagrammatically by the conduit 66 in Fig. 8, and port 24.

There are three operating conditions:

(1) When the output shaft 19 is stationary and the drive shaft 25 is rotating (as in "neutral").

(2) When the shaft 19 rotates more slowly in the same direction than the shaft 25.

(3) When both shafts rotate at the same speed.

In the first condition the motor Rotoids have the same capacity as the pump Rotoids. Therefore the pump pinion 41 can roll around in its outer Rotoid 40 freely for each revolution of the shaft 25. In other words there is 100 percent hydraulic flow.

Figure 6:
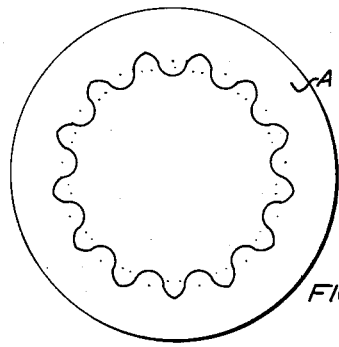
Fig. 6 shows a pinion gear bulkhead.
Figure 7:
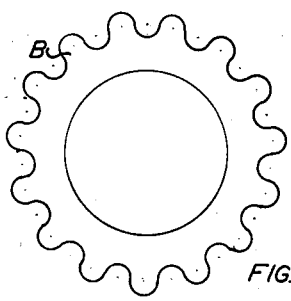
Fig. 7 shows an outer gear bulkhead.

In the second condition where the bulkheads A and B in Figs. 1, 6 and 7 are moved closer together the motor capacity is reduced. If the distance between the bulkheads is reduced one-third, then the pinion 41 can only roll around in its outer gear 40 two-thirds as far for each revolution of the shaft 25 or 1⅔ equals ⅓ of a revolution of the output shaft 19 in the same direction.

As these bulkheads get closer and closer together the hydraulic pumping is more and more reduced. The speed of each inner gear on each cam becomes slower and the speed of the shaft 19 increases and approaches that of the shaft 25.

In the third condition the bulkhead A is close to the bulkhead B and covers the holes 56 in the pinion 32 establishing a condition of hydraulic lock. The pinion gear 41 cannot roll in its outer gear 40 and the pinion gear 32 cannot roll in its outer gear 31. Consequently the drive shaft 25 drives the casing and the shaft 19 at the same speed.

When the bulkheads A and B are in this close position for what corresponds to direct speed drive in a car, the bulkhead A acts like a valve and shuts off the flow.

The space 69 (Fig. 14) between bulkheads A and B prevents capillary adhesion between them when close together. Consequently the gear chambers in the variable capacity unit are always full of fluid in the condition of hydraulic lock preventing gear 32 moving around in gear 31 in this 1:1 ratio.

During the change in speed of the output shaft from zero to full speed the capacity of the motor has decreased from maximum to zero. That is, the working lengths of the gear teeth have decreased from maximum to minimum. Consequently the torque per revolution of the motor gears is greatest when the bulkheads are furthest apart. As the bulkheads are brought closer and closer together there is a gradual reduction in torque per revolution accompanied by smooth even increase in speed of the shaft 19 until it rotates at the same speed as the shaft 25.

There is a second hydraulic circuit which is used to control the motion of bulkhead B towards or away from the bulkhead A.

When the lever 1 is pulled to the right it pushes the ring 7 and piston rods 8 and 9 and pistons 10 and 11 to the right. The cylinders 12 and 13 have inlet and outlet passageways 67 and 68 (Figs. 1 and 4). When pistons 10 and 11 move to the right they push oil out of the right end of cylinders 12 and 13, thru the conduits 68 and 68a into the casing space J at the right of the bulkhead B. This forces the bulkhead B and pinion to the left. Oil flows out of the casing chamber 57 thru conduits 58 and 67 and back into the cylinders 12 and 13 at the opposite side of the pistons 10 and 11. When lever 1 is pushed back to its original position to the left, oil flows out of cylinders 12 and 13 into conduits 67 and 58, into casing space 57 pushing bulkhead A to the right. The casing space J is reduced in size lengthwise. Oil flows from J out through conduits 69 and 68 into the opposite ends of the cylinders 12 and 13.

These pistons 10 and 11 should have a relatively small diameter and long stroke. The small diameter lessens the force which has to be exerted by the lever 1 and the long stroke provides sensitivity of control.

The spring 37 merely serves to provide a natural tendency for the motor bulkheads to separate back to the "neutral" position.

Of course hydraulic fluid expands with heat and this mechanism can not be filled solidly with oil. A small amount of air should be left in the casings 16 and 16a.

The casing 3 may have oil in it to lubricate the ring 7 and bearing 29. This oil will help cool the rotating casing 16 and 16a and the mechanism therein. In this case the opening 2 should have a splash cover to prevent the escape of oil (not shown).

Figure 11:
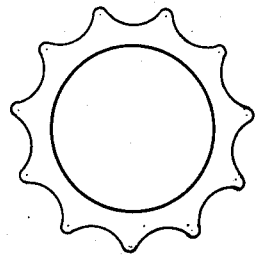
Fig. 11 shows an outer Gerotor bulkhead.
Figure 12:
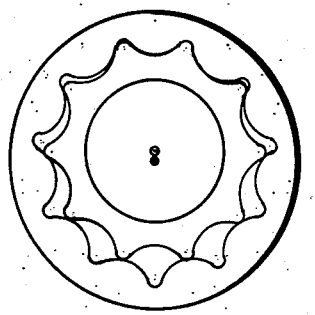
Fig. 12 shows a pair of Gerotors.
Figure 13:
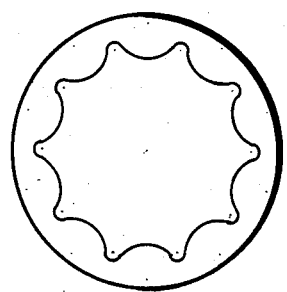
Fig. 13 shows a pinion Gerotor bulkhead.
Figure 14:
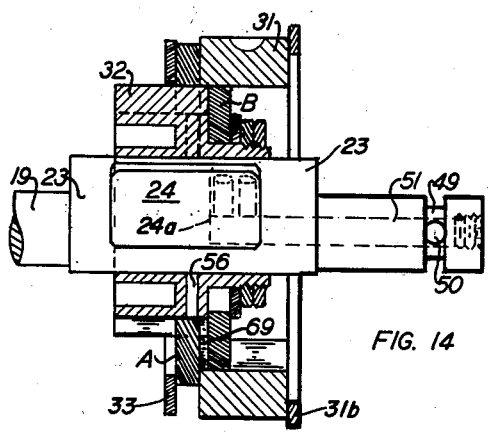
Fig. 14 shows the position of a pinion gear and both bulkheads when in "full speed."

Fig. 12 shows a pair of Gerotor gears with their respective bulkheads shown in Figs. 11 and 13. The pump could be a pair of Gerotors and the motor a pair of Rotoids or vice versa. However a casual inspection of Figs. 5 and 12 will show that the driving angles between the teeth of Rotoids are less than those between Gerotor teeth and Rotoids will be far more durable.

Either shaft may be the drive shaft and the other the driven shaft. I prefer the construction shown with the simpler pump unit adjacent or connected with the drive shaft as it lends itself to cheaper service when out in the field of use.

The motor gears and the pump gears do not have to have the same number of teeth, the same diameters, or the same eccentricity. The pump gears may be Gerotors and the motor gears may be Rotoids or vice versa.

Where it is necessary to have the output shaft stationary while the drive shaft rotates, both pump and motor should have the same capacity.

However, in an electric motor reduction gear drive this is frequently not desirable. A certain minimum gear ratio may be preferable. When this is the case, then the variable capacity unit need only have a maximum capacity, ⅓ or ¼ or ⅒ smaller than that of the fixed capacity unit.

By having the high fluid pressure confined within both sets of gears and the shafts supporting them all pressure is removed from the casing and stuffing boxes.

The intake of the pump is near the outer part of the inside of the rotating casing and the discharge port into the casing is near the shaft. When air or gas is left inside the transmission for fluid heat expansion, centrifugal force will throw the oil to the outside of the casing chambers 57, J, K and L, and the air or gas will stay near the center. This air or gas will act partially as a cushion to provide a soft easy action and prevent hydraulic shock.

I do not limit my invention to the specific structure shown. Other arrangements of parts are possible without departing from the spirit of my invention.

In principle, my invention includes a pump unit and a motor unit. Either one or both have a variable capacity by which the hydraulic capacity per revolution of one or the other can be varied. When the hydraulic capacity per revolution is lessened, then the difference in speed of the drive and driven shafts is reduced.

What I claim is:

1. In a hydraulic transmission, a rotatable casing containing a pump and a motor each having an outer gear and an inner or pinion gear, one within, eccentric to, and having fewer teeth than the other, the teeth of said gears having mutually generative contours maintaining continuous fluid tight engagements between the teeth of each gear at steady angular speeds between open mesh and full mesh so as to open and close displacement chambers between said gears, a drive shaft, a cam on said drive shaft journalling one of said inner gears, a driven shaft, a cam on said driven shaft journalling the other of said inner gears, said shafts acting as journals for said rotatable casing, said outer gears being mounted in and keyed to said rotatable casing, said displacement chambers between one pair of said inner and outer gears having a fixed capacity per revolution and displacement chambers between the other pair of said inner and outer gears having a variable capacity per revolution, a first bulkhead adjacent to one end of said inner gear of said other pair, means to hold said bulkhead adjacent to said one end and slidable longitudinally with said inner gear in said outer gear of said other pair, a second bulkhead mounted on the tooth contours of said inner gear of said other pair and having a slidable relation therewith, means to hold said second bulkhead in a fixed position adjacent to the end of said outer gear of said outer pair furthest away from said one end of said inner gear, means to cause said inner gear and said first bulkhead to move longitudinally with relation to said second bulkhead and said outer gear adjacent thereto, intake and discharge ports of said displacement chambers rotating with said cams of said inner gears, and passageways to conduct fluid from closing chambers of one pair of said gears to opening chambers of the other pair of said gears.

2. The combination according to claim 1, said means to move said first bulkhead and said inner gear consisting of at least one piston and cylinder in said rotatable casing, one cylinder end connected by fluid passageways to a chamber in said rotatable casing at one end of said slidable inner gear and the other one cylinder end connected to a chamber at the opposite end of said slidable inner gear and control means to actuate each of said pistons in said cylinders.

3. The combination according to claim 1 and having said drive shaft drive said cam of said inner gear of said pair of gears having a fixed capacity per revolution.

4. In a hydraulic transmission, a rotatable casing containing a pump and a motor each having an outer gear and an inner or pinion gear, one within, eccentric to, and having fewer teeth than the other, the teeth of said gears having mutually generative contours maintaining continuous fluid tight engagements between the teeth of each gear at steady angular speeds between open mesh and full mesh so as to open and close displacement chambers between said gears, a drive shaft, a cam on said drive shaft journalling one of said inner gears, a driven shaft, a cam on said driven shaft journalling the other of said inner gears, said shafts acting as journals for said rotatable casing, said pump having a fixed volumetric capacity per revolution, said gears in said motor having two bulkheads to vary their volumetric capacity per revolution, one bulkhead adjacent to one end of the inner gear and slidable inside the outer gear, the other bulkhead adjacent to the end of said outer gear furthest away from said end of said inner gear and having said inner gear slidable in said other bulkhead, means to move said inner gear and the bulkhead at its end longitudinally in said outer gear, intake and discharge ports for said gears rotating with said cams, and passageways to conduct fluid from closing chambers of one pair of said gears to open chambers of the other pair of said gears.

5. The combination according to claim 1, said means to move said inner gear and said bulkhead adjacent to its end consisting of at least one piston and cylinder in said rotatable casing, one cylinder end connected by fluid passageways to a chamber in said rotatable casing at one end of said slidable inner gear and the other one cylinder end connected to a chamber at the opposite end of said slidable inner gear and control means to actuate each of said pistons in said cylinders.

References Cited in the file of this patent

UNITED STATES PATENTS

| | | |
|---|---|---|
| 711,662 | Herdman | Oct. 21, 1902 |
| 1,647,621 | Hawley | Nov. 1, 1927 |
| 1,682,303 | Möhl | Aug. 28, 1928 |
| 1,690,086 | Miles | Oct. 30, 1928 |
| 1,853,430 | Jensen | Apr. 12, 1932 |
| 2,140,966 | Nichols | Dec. 20, 1938 |
| 2,443,074 | Kraft | June 8, 1948 |
| 2,484,789 | Hill et al. | Oct. 11, 1949 |